(12) United States Patent
Ekambaram

(10) Patent No.: US 12,108,198 B2
(45) Date of Patent: Oct. 1, 2024

(54) DRONE GATEWAY DEVICE TO COLLECT THE SENSOR DATA

(71) Applicant: InterDigital CE Patent Holdings, SAS, Paris (FR)

(72) Inventor: Gangatharan Ekambaram, Chennai (IN)

(73) Assignee: InterDigital CE Patent Holdings, SAS, Paris (FR)

( * ) Notice: Subject to any disclaimer, the term of this patent is extended or adjusted under 35 U.S.C. 154(b) by 614 days.

(21) Appl. No.: 17/293,524

(22) PCT Filed: Nov. 28, 2019

(86) PCT No.: PCT/EP2019/082847
§ 371 (c)(1),
(2) Date: May 13, 2021

(87) PCT Pub. No.: WO2020/109440
PCT Pub. Date: Jun. 4, 2020

(65) Prior Publication Data
US 2022/0030333 A1    Jan. 27, 2022

(30) Foreign Application Priority Data

Nov. 29, 2018  (EP) .................... 18306580

(51) Int. Cl.
*G16Y 30/00* (2020.01)
*G05D 1/00* (2024.01)
(Continued)

(52) U.S. Cl.
CPC ............. *H04Q 9/00* (2013.01); *G05D 1/0094* (2013.01); *G16Y 30/00* (2020.01); *G16Y 40/10* (2020.01); *H04Q 2209/50* (2013.01)

(58) Field of Classification Search
None
See application file for complete search history.

(56) References Cited

U.S. PATENT DOCUMENTS

| | | | |
|---|---|---|---|
| 9,845,164 B2 | 12/2017 | Ahmed et al. | |
| 10,909,859 B1* | 2/2021 | Dodd | G07C 5/0816 |
| 2004/0230345 A1 | 11/2004 | Tzamaloukas | |
| 2017/0041978 A1 | 2/2017 | Radhakrishnan | |
| 2017/0332198 A1 | 11/2017 | Dannenbring et al. | |
| 2018/0144034 A1 | 5/2018 | Das et al. | |
| 2020/0148348 A1* | 5/2020 | Bradley | B64C 39/022 |

FOREIGN PATENT DOCUMENTS

| | | |
|---|---|---|
| CN | 1833239 A | 9/2006 |
| CN | 105828345 A | 8/2016 |

(Continued)

OTHER PUBLICATIONS

Ueyama ("Exploiting the Use of Unmanned Aerial Vehicles to Provide Resilience in Wireless Sensor Networks", 2014, IEEE Communication Magazine) (Year: 2014).*

(Continued)

*Primary Examiner* — Roy Y Yi
(74) *Attorney, Agent, or Firm* — CONDO ROCCIA KOPTIW LLP

(57) ABSTRACT

An apparatus and method are provided for collecting data via an autonomous drone. In one embodiment, the method includes receiving sensor data collected by at least one sensor via the autonomous drone. The data collected also includes geo-location of the at least one sensor. This sensor data is then stored in a database and analyzed. A request is sent to the drone for additional data collection when the sensor data is determined to be incomplete after analysis.

15 Claims, 4 Drawing Sheets

410 — receiving sensor data collected by at least one sensor via an autonomous drone; where the drone also communicates geo-location of each sensor location;

420 — storing the sensor data and other received data in a trajectory database;

430 — analyzing sensor data by an analysis module;

440 — sending request to the drone to retrieve and transmit more data when said analysis step indicated additional data is needed.

(51) Int. Cl.
*H04Q 9/00* (2006.01)
*G16Y 40/10* (2020.01)

(56) References Cited

FOREIGN PATENT DOCUMENTS

| CN | 206004706 | U  | 3/2017  |
|----|-----------|----|---------|
| CN | 107449433 | A  | 12/2017 |
| CN | 107531326 | A  | 1/2018  |
| CN | 108090318 | A  | 5/2018  |
| CN | 108603945 | A  | 9/2018  |
| WO | 2016/145411 | A1 | 9/2016 |
| WO | 2017/079489 | A1 | 5/2017 |

OTHER PUBLICATIONS

Wang et al, "Efficient Aerial Data Collection with UAV in Large-Scale Wireless Sensor Networks", International Journal of Distributed Sensor Networks, vol. 2015, Jan. 1, 2015 (Jan. 1, 2015), pp. 1-19, XP055287469, USISSN: 1550-1329, DOI: 10.1155/2015/286080*p. 2, left-hand column, paragraphs second, last*.

Ma et al, "Fairness-aware UAV-assisted data collection in mobile wireless sensor networks," 2016 International Wireless Communications and Mobile Computing Conference.

CN105828345A TR EN Machine May 5, 2021.

Abu Safia et al, "Efficient Data Collection by Mobile Sink to Detect Phenomena in Internet of Things," 2017, Information vol. 8, No. 4.

CN206004706U TR EN Machine May 5, 2021.

Cermakova et al, "Modelling a process of UAV data collection and processing", 2016 International Conference on Information Society (I-Society), Oct. 1, 2016 (Oct. 1, 2016), pp. 161-164, XP055595971, DOI: 10.1109/i-Society.2016.7854203 ISBN: 978-1-908320-61-2*p. 163, paragraph A**abstract*.

Olivier et al, An algorithm for aerial data collection from wireless sensors networks by groups of UAVs, 2017 IEEE/RSJ International Conference on Intelligent Robots and Systems.

* cited by examiner

Figure 4

| 410 | receiving sensor data collected by at least one sensor via an autonomous drone; where the drone also communicates geo-location of each sensor location; |

| 420 | storing the sensor data and other received data in a trajectory database; |

| 430 | analyzing sensor data by an analysis module; |

| 440 | sending request to the drone to retrieve and transmit more data when said analysis step indicated additional data is needed. |

DRONE GATEWAY DEVICE TO COLLECT THE SENSOR DATA

CROSS REFERENCE TO RELATED APPLICATIONS

This application is the national stage entry under 35 U.S.C. § 371 of International Application PCT/EP2019/082847, filed Nov. 28, 2019, which was published in accordance with PCT Article 21(2) on Jun. 4, 2020, in English, and which claims the benefit of European Patent Application No. 18306580.4, filed Nov. 29, 2018.

TECHNICAL FIELD

The present embodiments relate generally to processing sensor collected data and more particularly to processing sensor collected data received via an autonomous drone.

BACKGROUND

This section is intended to introduce the reader to various aspects of art, which may be related to various aspects of the embodiments described and/or claimed below. This discussion is believed to be helpful in providing the reader with background information to facilitate a better understanding of the various aspects. Accordingly, it should be understood that these statements are to be read in this light, and not as admissions of prior art.

A sensor is a device or module that is made to detect events or changes in the environment that it has been disposed. Sensors have the ability not only to detect and store such change but to also send this information to other devices. The information is most often sent to some form of a computer processor. Many sensors are part of a multi sensor network or a subsystem and are often co-located with other electronics.

In early years, most traditional sensors were manufactured to detect changes in temperature, light and flow or pressure in an environment changes. Both mechanical or chemical means were used to provide information about such changes and record their measurements. However, in recent years, with the advancements in scientific fields as well as that of micromachinery, the use of sensors has expanded well beyond the traditional fields. Sensors are used today in many applications including manufacturing and machinery, airplanes and aerospace, cars, medicine, and event in many areas of robotics.

The recent popularity of adopting Internet of Things (IoT) into household and offices have increased the reliance on sensors and the research in expanding their use even further. However, as the IoT and other environments that incorporate sensors expand, certain issues arise. The number of sensors used in some environments are growing exponentially. This creates bandwidth issues especially when these sensors are co-located and when data that is being collected has to be processed in real time. In such situations, data integrity may be affected and data processing can become ineffective. Consequently, a method and system is desirous that can process and collect large amount of data simultaneously and in real time.

SUMMARY

An apparatus and method are provided for collecting data via an autonomous drone. In one embodiment, the method includes receiving sensor data collected by at least one sensor via the autonomous drone. The data collected also includes geo-location of the at least one sensor. This sensor data is then stored in a database and analyzed. A request is sent to the drone for additional data collection when the sensor data is determined to be incomplete after analysis.

Additional features and advantages are realized through similar techniques and other embodiments and aspects are described in detail herein and are considered a part of the claims. For a better understanding of advantages and features, refer to the description and to the drawings.

BRIEF DESCRIPTION OF THE DRAWINGS

The present disclosure will be better understood and illustrated by means of the following embodiment and execution examples, in no way limitative, with reference to the appended figures on which:

FIG. 4 is a flow chart representation of a methodology according to one embodiment.

Wherever possible, the same reference numerals will be used throughout the figures to refer to the same or like parts.

DESCRIPTION

It is to be understood that the figures and descriptions have been simplified to illustrate elements that are relevant for a clear understanding, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

Figure 1:
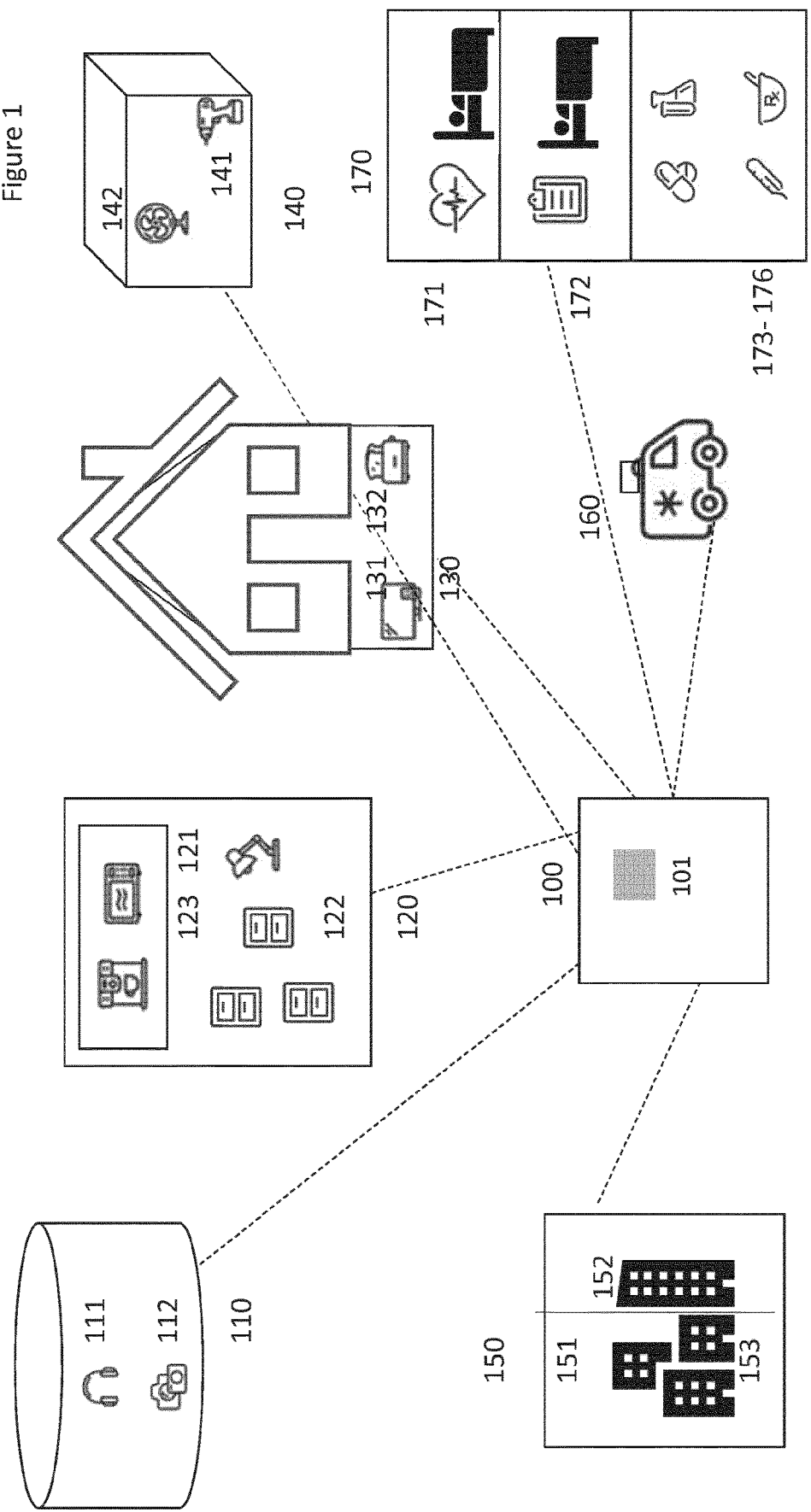
FIG. 1 schematically represents a block diagram of a system receiving data from a number of location according to one embodiment.

FIG. 1 is a block diagram illustrating a system 100 that can receive and display content of a number of data received from diverse establishments 110 to 190. The system 100 can be a simple processor (shown as 101) or be a sophisticated system with many processors and expanded processing power. In the embodiment shown, each establishment can have one or more sensors and data can be collected independently from them or collectively such as in cases where there is a network of sensors. For example, the sport arena 110 can have sensors connected to its auditory system 111 or broadcast and or camera/video equipment 112. An office building 120 can have a sensor monitoring its lights 121, or file/data room 122 or kitchen 123. A house 130 can have its consumer electronics (i.e. touch screen etc.) being monitored by sensors 131. Sensors are also provided in the kitchen (132) so as to monitor heat or smoke or even ambient lighting. A warehouse can have its equipment 141 or temperature 142 being monitored by one or more sensors. A store and/or shop 150 can be comprised of a lot of different businesses 151 to 153 and each business may have a different sensor, monitoring things from temperature to motion to carbon monoxide levels. A vehicle like an ambulance 160 can have sensors monitor a variety of things including location change and a hospital 170 can also have a lot of different sensors 171 to 176. That monitor a number of factors ranging from patient health conditions to medication distributions to oxygen flow and other relevant information.

The system 100 can be sophisticated and contain many components (not shown). These components may include one or more servers and other computers or even smart mobile devices such as tablets and smart phone. It can also can include decoders/encoders, displays and CPU having at least a processor 101, as well as memory components and user interfaces.

In one embodiment, a "sensor" refers to a variety of devices as can be appreciated by those skilled in the art. In one embodiment, a sensor device is used to sense or detect one or more characteristic parameters of an environment or a location. Some example of the environment may include, but is not limited to, indoor environments and outdoor environments. Some example of the location may include, but is not limited to, indoor locations in the indoor environments such as houses, industrial plants, offices, institutions, entertainments venues such as concert halls and the like and outdoor locations in the outdoor environments can also include backyards, parks, public streets, sport arenas and amusements parks and the like Some example of the sensors may include, but is not limited to, infrared cameras, smoke sensors, electrochemical gas sensors, gas analyzers, vibration sensors, sound sensors, ultrasound sensors, and Radio-Frequency Identification tag readers, tactile sensors, temperature sensors and the like. In such capacity, "sensor data" refers to any digital data generated using the sensor that has been referred to as previously mentioned. "Non-historic sensor data" refers to the sensor data which has been generated last by the sensor and "Historic sensor data" refers to the sensor data which had been generated by the sensor before the non-historic sensor data was generated.

From time to time the word "visual marker" may be used. A visual marker may refer to a visually recognizable identifier such as a pattern, shape or symbol that includes optical machine-readable data, used to identify a location, a device or equipment in an industrial plant. Some examples of the visual marker may include, but are not limited to, Quick Response codes, Bar codes, and Roundels.

Figure 2:
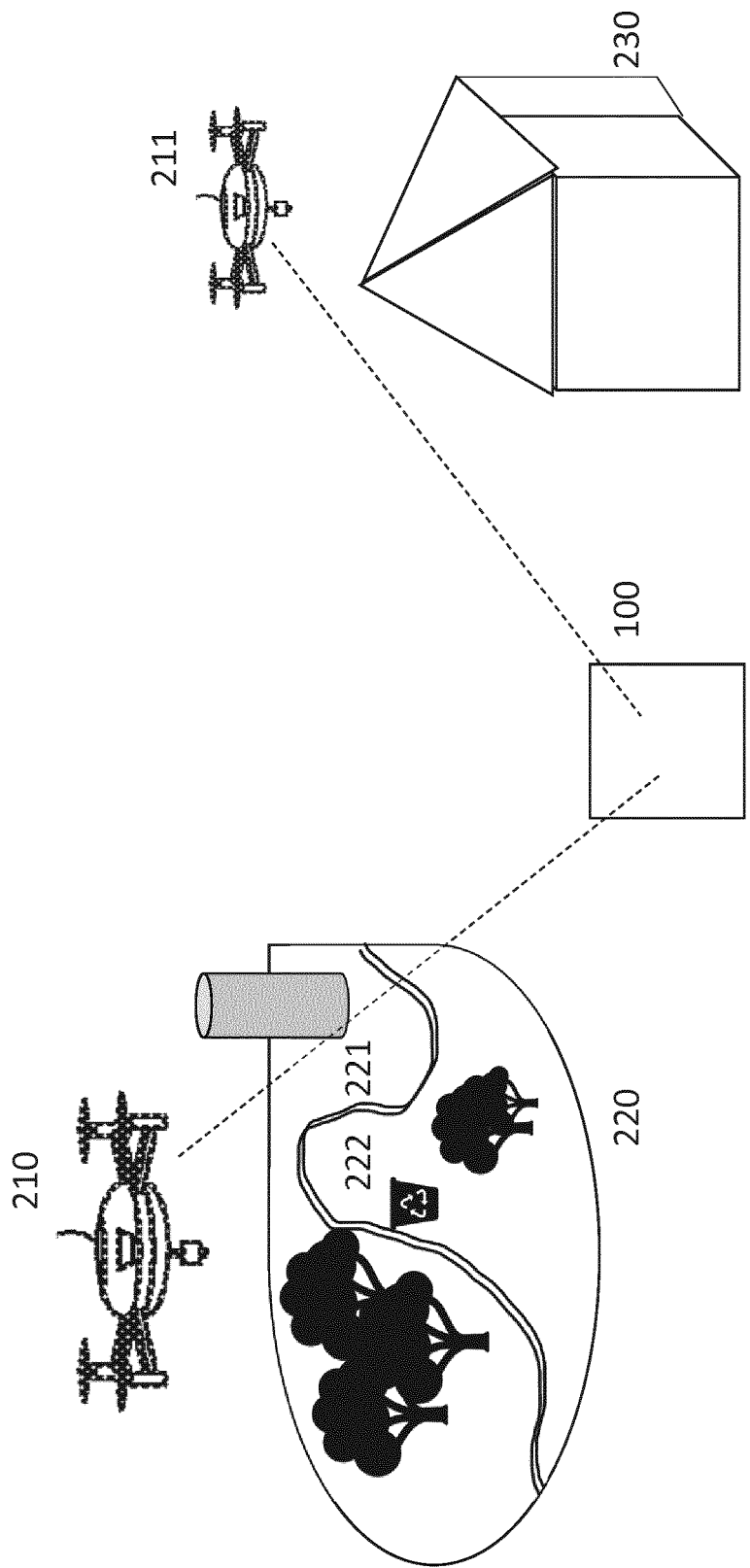
FIG. 2 schematically represents a block diagram of a system receiving data collected using drones according to one embodiment.

FIG. 2 is a depiction of an unmanned aerial vehicle (UAV) or drone. For ease of illustration, FIG. 2 only shows two drones 210 and 211 that are disposed in proximity of two different locations, one is a sport arena 220 and the other a residential building 230. The drones are equipped with digital imaging capabilities and can communicate and/or with sensors located in the park/residence area 220 and residence 230 and/or contain sensors themselves. Information gathered from such these drones, in one embodiment can be then sent to a system such as the one provided in FIG. 1 and referenced as 100. Drones can be paired with one or more sensors and obtain part or all of sensor collected information. Drones can also send requests to receive different types of data using the sensors. This can be achieved via processors such as the one shown by FIG. 1 at 101. Visual markers can be used, in one embodiment for such paring. Such paring can be continuously updated as drones and/or sensors join the system 100. The system can keep track of monitoring availability and pairings.

FIG. 2 can be used in a variety of embodiments. For example, as discussed earlier, as the IoT environment is expanding the number of sensors also grows exponentially. As the sensor devices need a gateway to connect with cloud, the capability of gateway to handle multiple sensors also limited. There may be the situation where the sensor data are not required to get at real time, means a periodic collection of sensor data might be sufficient like energy consumed, water level at public water tank such as shown at 221, garbage at public garbage bins as shown at 222, in such scenarios having a dedicated gateway devices may not require.

To address this problem, there can be a drone gateway, in one embodiment which will move around to collect the sensor data and send it to the back office for processing. As the IoT devices are growing exponentially the necessity of gateway becomes vital, to resolve the wide network there are multiple protocols are coming into market day to day (like Iotivity/thread/LoRaWan/ZWave etc.) as the network gets wide and wide the number of gateway devices to manage it also increases. There are some cases where sensor data are not required to handle more real time. In such cases having a dedicated gateway for those sensors is waste of money. Such non-real time sensor data can be collected by drone gateway where the gateway will move toward sensors and collect its data and send to cloud.

In one embodiment, at the time of installation, the said gateway device can be paired with sensor. At the time of pairing process the drone may remember the sensor and its geo location by its GPS co-ordinates, and at periodic interval drone gateway may fly to collect the information from the sensors and send it to cloud. The list of sensors and its details may be seen using the web UI of the gateway from a laptop or a mobile device.

Figure 3:
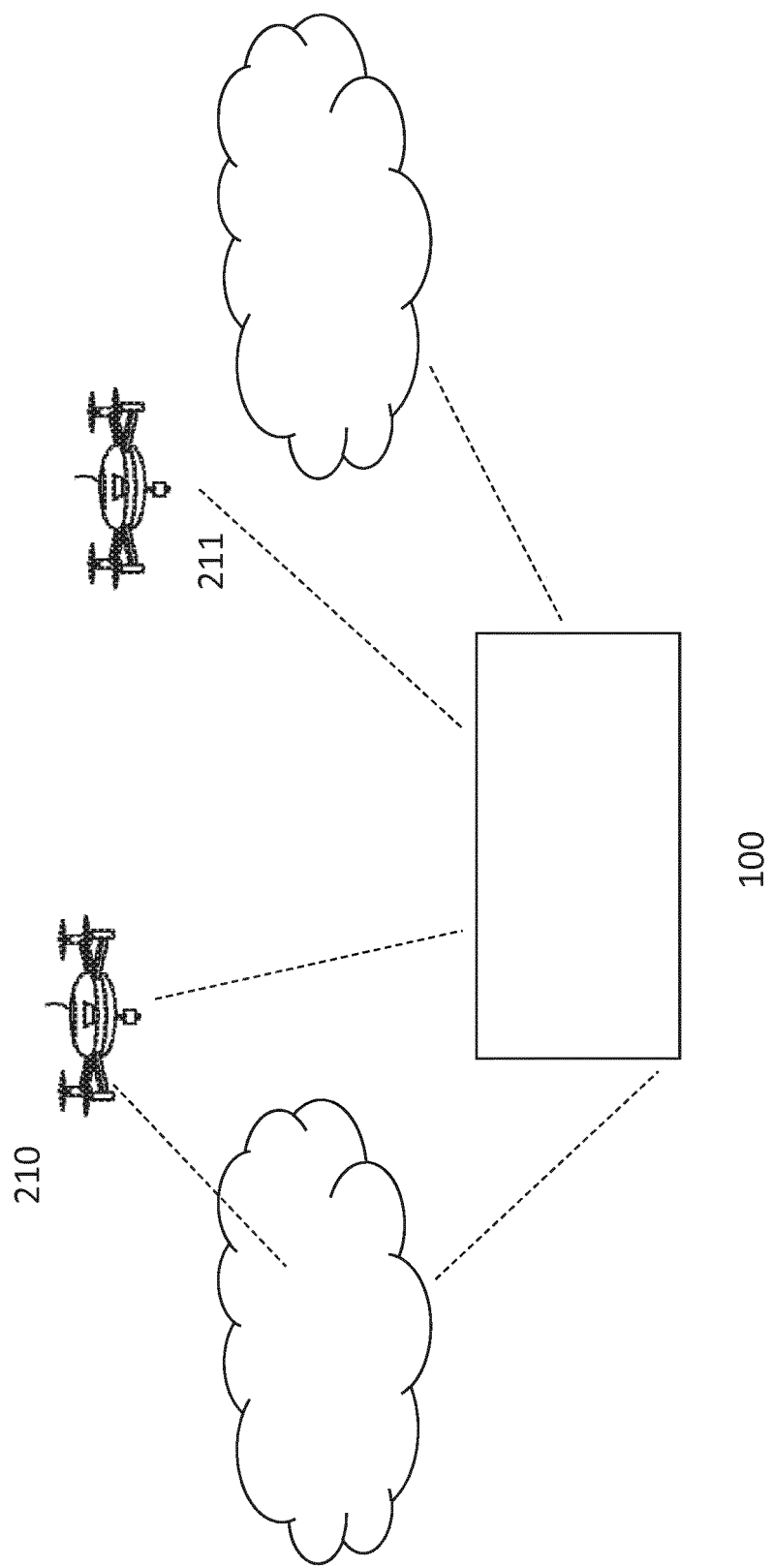
FIG. 3 is an illustration of a distribution system of data processing according to one embodiment.

FIG. 3 is a block diagram of one embodiment providing connectivity solutions. In one example as shown, the data from the drones 210/211 can go directly to the system 100 or be connected to other networks or even the cloud or be connected to both. In one embodiment, the drone gateway can have LTE module for the internet connectivity. In another embodiment, the drone can have access or be a universal Gateway device which supports multiple protocols (zigbee/zwave/BLE/wifi/LoRaWan etc.). In yet another embodiment, the drone can have GPS receiver for latitude and longitude calculation and compare it with the sensor's GPS co-ordinates so that gateway can move accordingly. As can be appreciated by those skilled in the art, the drone can in this way be different in different embodiments and can be retrofitted accordingly. For example, in one scenario the drone can have an inbuilt camera to capture the video when required, while in another scenario it may contain a barometer to measure the height from the ground.

Once the gateway data (GW) reaches the sensor's position it may get connect to the sensor's radio by reading the lookup table. The lookup table may contain the sensor Id, sensor type, sensor radio and sensor's co-ordinate and the height at which the drone was at the time of pairing process. Once connected, gateway may request sensor/device for the available/current information (e.g. check water level/check garbage level/get the energy consumption reading).

The sensor/device should be kept in the tamper proof case so that others cannot break or hack it. When gateway didn't able to find the sensor at the corresponding co-ordinate, GW can move around +/−20 m before taking the decision about unavailability of sensor. These 20 meters is a random number considering the approximate accuracy of the GPS receiver or any signal issue. When the sensor device is not found then gateway at the targeted co-ordinate then may send the alert notification to the cloud back office. The altitude can be approximately 300 m, considering the rules (i.e FAV for UAV) as limit of 400 m. It can hold two rechargeable batteries and it can auto switch to second one when the first battery level goes below 10%. The drone may start fly only when both the batteries are full, also it can start its return journey on any case when the first battery level goes below 10%. The drone and gateway can be detachable module, so that gateway module can fit into any other similar drone.

Gateway device(s) can have a separate battery for its operation, so that the drone battery can only be used for drone. The gateway can be inside a small cabin made of strong heat resistive material which is covered by cushioned airbags so that at emergency landing or any accident will not damage the gateway. The reading of GPS can be updated in the internal database for every 30 seconds.

In one embodiment, the drone can even have a crash sensor which detects the crash of drone and send signal to drone's GW, which will send emergency information to the cloud with last known GPS location and present GPS location, last known GPS location may help to track if the current GPS location cannot be retrieved by GW due to severe damage of drone.

FIG. 4 is a flow chart depiction of one method used as per one embodiment. In step 410, sensor data collected is received, such as by a processor. The data is collected at least from at least one sensor via an autonomous drone; where the drone also communicates geo-location of each sensor location. In step 420, the sensor data and other received data is stored in a trajectory database. In step 430, the sensor data is analyzed by an analysis module and in step 440, a request is sent to the drone to retrieve and transmit more data when the analysis step indicated additional data is needed.

While some embodiments have been described, it will be understood that those skilled in the art, both now and in the future, may make various improvements and enhancements which fall within the scope of the claims which follow.

The invention claimed is:

1. A method implemented by a drone gateway device, the method comprising:
   during a pairing of the drone gateway device with a remote sensor device at a geo-location of the remote sensor device, storing the geo-location of the remote sensor device;
   after the pairing of the remote sensor device with the drone gateway device, the drone gateway device receiving a request to retrieve sensor data collected by the remote sensor device;
   the drone gateway device moving autonomously to the geo-location of the remote sensor device that was stored during the pairing;
   when the drone gateway device has reached the stored geo-location of the remote sensor device, the drone gateway device establishing a wireless connection with the remote sensor device at the stored geo-location;
   the drone gateway device retrieving, via the established wireless connection with the remote sensor device at the geo-location of the remote sensor device, sensor data collected by the remote sensor device; and
   the drone gateway device transmitting the retrieved sensor data for processing.

2. The method of claim 1, wherein the remote sensor device is disposed at a waypoint location, and wherein the waypoint location is defined as a first set of coordinates that identify a specific point in physical space.

3. The method of claim 1, wherein the retrieved sensor data is stored in a database and a collection of trajectory data is stored in the database.

4. The method of claim 1, wherein a plurality of drone gateway devices with a plurality of sensor devices are implemented and each drone gateway device of the plurality of drone gateway devices is paired with at least one sensor device of the plurality of sensor devices.

5. The method of claim 1, wherein a plurality of drone gateway devices retrieve the sensor data.

6. The method of claim 1, wherein, during the pairing, the drone gateway device stores a height of the drone gateway device.

7. The method of claim 1, wherein the sensor data comprises a sensor device type and an associated sensor identification.

8. A non-transitory computer-readable medium storing computer-executable instructions which, when executed by at least one processor, cause the processor to perform the method of claim 1.

9. A drone gateway device comprising at least one processor configured to:
   during a pairing of the drone gateway device with a remote sensor device, store a geo-location of the remote sensor device;
   receive a request to retrieve sensor data collected by the remote sensor device;
   move autonomously to the stored geo-location of the remote sensor device;
   when the drone gateway device has reached the stored geo-location of the remote sensor device, establish a wireless connection with the remote sensor device at the stored geo-location;
   retrieve, via the established wireless connection with the remote sensor device at the geo-location of the remote sensor device, sensor data collected by the remote sensor device; and
   transmit the retrieved sensor data for processing.

10. The drone gateway device of claim 9, wherein the remote sensor device is disposed at a waypoint location, and wherein the waypoint location is defined as a first set of coordinates that identify a specific point in physical space.

11. The drone gateway device of claim 9, wherein the retrieved sensor data is stored in a database and a collection of trajectory data is stored in the database.

12. The drone gateway device of claim 9, wherein a plurality of drone gateway devices with a plurality of remote sensor devices are implemented and each drone gateway device of the plurality of drone gateway devices is paired with at least one remote sensor device of the plurality of remote sensor devices by the at least one processor.

13. The drone gateway device of claim 9, wherein a plurality of drone gateway devices retrieve the sensor data.

14. The drone gateway device of claim 9, wherein the drone gateway device stores a height of the drone gateway device during the pairing.

15. The drone gateway device of claim 9, wherein the sensor data comprises a sensor device type and an associated sensor identification.

* * * * *